455-296 SR

FIP8106 OR 3,739,285

United States Patent [19]

Hepp

[11] 3,739,285

[45] June 12, 1973

[54] CIRCUIT ARRANGEMENT FOR SUPPRESSING INTERFERENCES IN AN FM RADIO RECEIVER

[75] Inventor: Gerard Hepp, Eindhoven, Netherlands

[73] Assignee: U.S. Philip Corporation, New York, N.Y.

[22] Filed: Oct. 21, 1970

[21] Appl. No.: 82,611

[30] Foreign Application Priority Data

Oct. 25, 1969 Netherlands ........................ 6916127

[52] U.S. Cl. .............................. 325/473, 179/15 BT

[51] Int. Cl. ................................................ H04b 1/10

[58] Field of Search .................. 325/348, 470, 473, 325/474, 475, 476, 478, 479, 480, 482, 65; 179/15 BT, 15 BP; 328/162–165; 320/1

[56] References Cited

UNITED STATES PATENTS

| | | | |
|---|---|---|---|
| 2,464,279 | 3/1949 | Zarem et al. | 320/1 |
| 3,462,691 | 8/1969 | McDonald | 325/475 |
| 3,588,705 | 6/1971 | Paine | 325/480 |
| 3,191,123 | 6/1965 | Eness et al. | 325/473 |
| 3,140,446 | 7/1964 | Myers et al. | 325/474 |

*Primary Examiner*—Robert L. Griffin
*Assistant Examiner*—William T. Ellis
*Attorney*—Frank R. Trifari

[57] ABSTRACT

A circuit arrangement for interference suppression in which the signal is applied through a gating circuit which is blocked during interference to a storage capacitor whose voltage remains constant during interference.

To reduce the distortion as a result of a pilottone serving for the stereo detection of a stereo signal a parallel resonant circuit tuned to the pilot tone is incorporated in series with the storage capacitor.

5 Claims, 3 Drawing Figures

Figure 1:
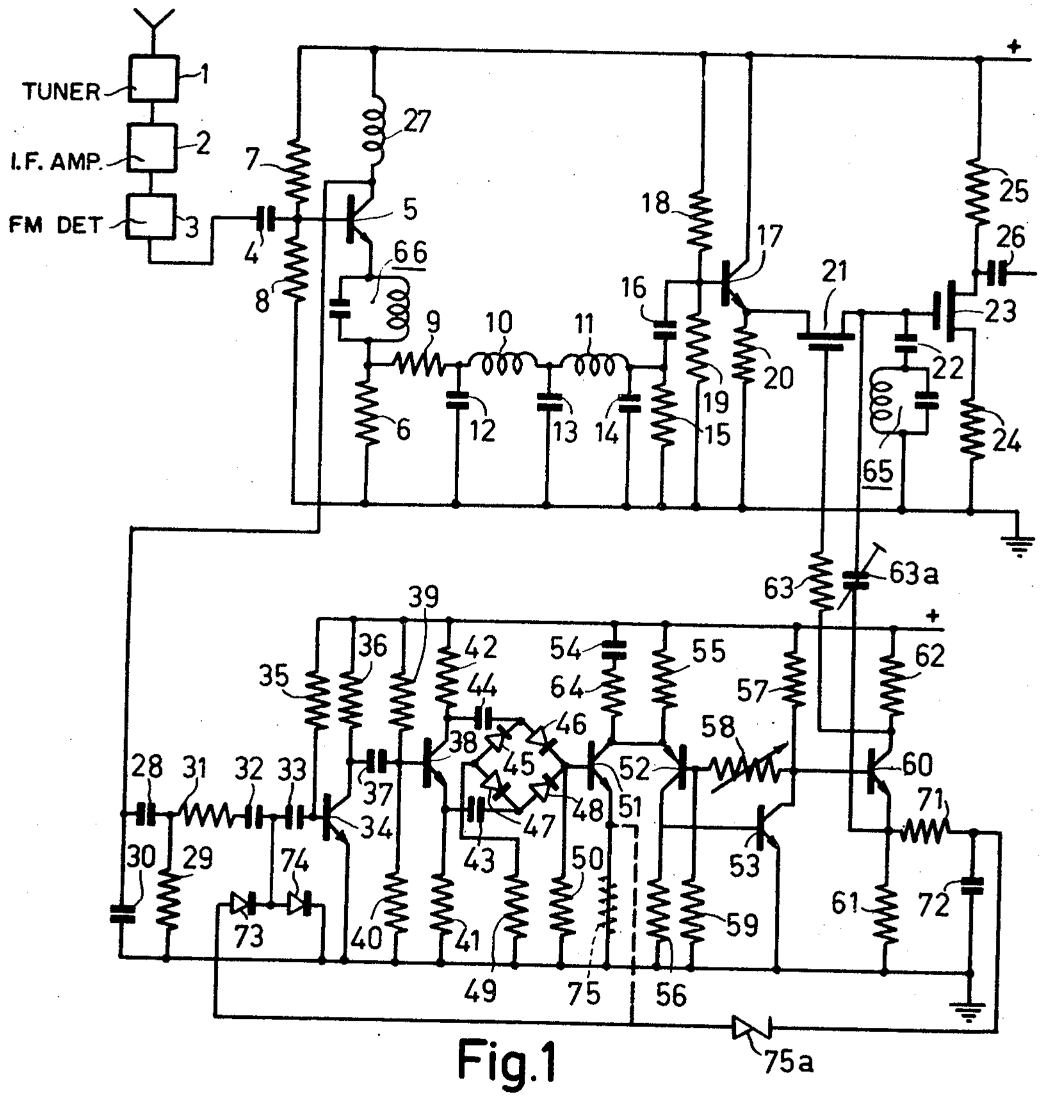

INVENTOR.
GERARD HEPP
BY
Frank R. Trifari
AGENT

INVENTOR.
GERARD HEPP
BY
Frank R. Trifari
AGENT

CIRCUIT ARRANGEMENT FOR SUPPRESSING INTERFERENCES IN AN FM RADIO RECEIVER

The invention relates to a circuit arrangement for suppressing interference in an FM radio receiver. The circuit arrangement includes an FM signal detector and an interference detector. The output signal from the signal detector is applied through a gating circuit to a storage capacitor, while the output signal from the interference detector controls a pulse shaper whose output pulses block a gating circuit during the occurrence of an interference pulse. An interference-free signal is derived from the storage capacitor.

Such a circuit arrangement is known from an article in the magazine Alta Frequenza, vol. XXXVI, no. 8, August 1967 pages 726–731. This article describes an FM receiver in which an interference detector consisting of an AM detector is connected to the intermediate frequency channel of the receiver. An interference pulse in the received signal causes both an amplitude variation and a phase variation of this signal. The phase variation gives rise to a clearly noticeable interference in the output signal from the FM signal detector. The amplitude variation of the intermediate frequency signal is detected in the interference detector and this detected signal triggers a monostable multivibrator operating as a pulse shaper whose output pulse blocks the gating circuit for a short period. This prevents the interference originating from the signal detector from reaching the AF amplifier. Due to the storage capacitor present behind the gating circuit it is achieved that not the inference, but the voltage present across the storage capacitor and corresponding to the signal which was present just before the occurrence of the interference is applied to the AF amplifier.

It is to be noted that it is, for example, alternatively possible to use an interference detector which comprises one or more differentiating networks and to which the output signal from the FM detector is applied. In the output signal from the signal detector the interference pulses are distinguished from the desired signal in that their edges are usually considerably steeper than the edges of the signal. The differentiating networks pass the steep edges of the interference pulses unhampered while the less steep signal edges are considerably attenuated. In this manner the interferences are selected from the signal.

It has been found that despite the use of such a circuit arrangement a considerable interference remains as soon as a signal is received in which a 19 kHz pilot signal for the reception of stereo broadcasts is co-transmitted. This interference occurs when using the above-mentioned circuit arrangement in a mono receiver or in a stereo receiver switched for mono reception. In addition a considerably greater interference occurs in the case of stereo reception of the transmitted signal.

An object of the present invention is to obviate this drawback and to this end the circuit arrangement according to the invention is characterized in that for the interference-free reception of a signal, which includes a pilot signal required for stereo reception, a parallel resonant circuit tuned to this pilot signal is arranged in series with the storage capacitor.

Figure 2:
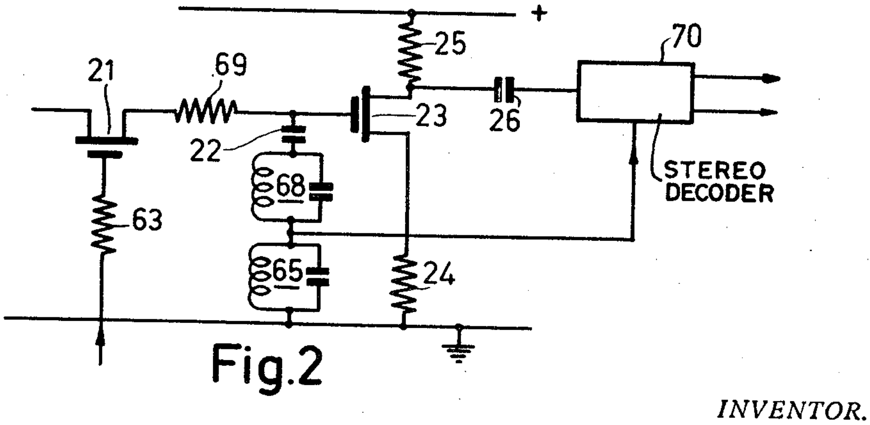
Figure 3:
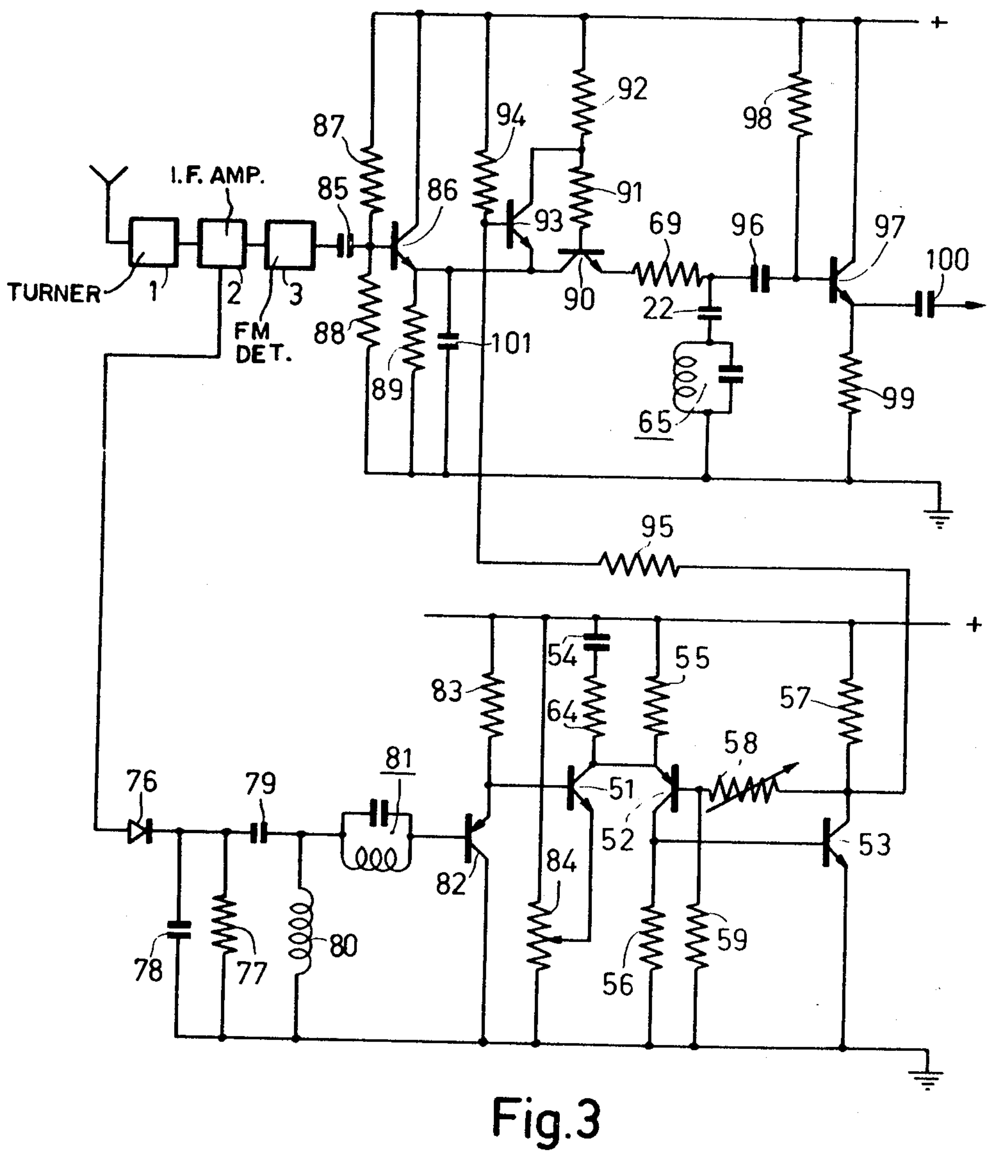

In order that the invention may be readily carried into effect, a few embodiments thereof will now be described in detail by way of example with reference to the accompanying diagrammatic drawings, in which:

FIG. 1 shows a first embodiment of a circuit arrangement according to the invention, FIG. 2 shows a modified detail of the circuit arrangement of FIG. 1, and FIG. 3 shows a second embodiment of a circuit arrangement according to the invention.

FIG. 1 shows a tuning unit 1, an intermediate frequency amplifier 2, and an FM signal detector 3 of a receiver for frequency-modulated audio signals. These components may be of conventional construction. The AF audio signal from the detector 3 is applied through a coupling capacitor 4 to the base electrode of a transistor 5 arranged as an emitter follower with emitter resistor 6. The base bias of this transistor is provided by two resistors 7 and 8. The signal across the resistor 6 is supplied through a resistor 9, a delay network which comprises inductors 10 and 11, capacitors 12, 13 and 14 and a terminating resistor 15 and subsequently through a coupling capacitor 16 to the base electrode of a second transistor 17 likewise arranged as an emitter follower. Resistors 18 and 19 serve for the base bias of this transistor and a resistor arranged in the emitter line serves as an output resistor for the audio signal.

The signal is subsequently applied to a storage capacitor 22 through a MOS-fieldeffect transistor 21 which is normally in a conducting state. The signal from this capacitor is subsequently amplified with the aid of a second MOS-field effect transistor 23 to which a supply electrode resistor 24 and a drain electrode resistor 25 are connected. The amplified signals across the drain electrode resistor 25 is passed on through a coupling capacitor 26 to an AF audio amplifier not further shown.

In order to detect the interferences from the signal, the collector line of transistor 5 incorporates an inductor 27 which together with the highly resistive output impedance of the transistor 5 constitutes a first differentiating network. The signal thus differentiated is once more differentiated in a second differentiating network comprising a capacitor 28 and a resistor 29. Due to the fact that the interference pulses are considerably steeper than the edges of the desired signal, voltage peaks caused by the interferences only occur across the resistor 29 while the desired signal does not produce any notable voltage across this resistor. It is to be noted that it is of essential importance for the operation of the circuit arrangement that the bandwidth of the receiver units 1, 2 and 3 is sufficiently large so that the interference pulses appear at the output of the signal detector 3 with sufficiently steep edges.

A parallel capacitor 30 included between the two differentiating networks prevents noise of very high frequency (100–200 kHz) which hardly interferes with the reception of the desired signal from being detected as an interference voltage.

The interference pulses thus obtained are applied through a resistor 31 and two capacitors 32 and 33 to the base electrode of an amplifier transistor 34 including base resistor 35 and collector resistor 36. The interference pulses amplified thereby control the base electrode of a phase-splitting transistor 38 through a coupling capacitor 37. The base bias of this transistor is provided by resistors 39 and 40 while this stage furthermore includes an emitter resistor 41 and a collector resistor 42.

The output voltages of the phase splitter, which relative to each other are in phase opposition, are applied through capacitors 43 and 44 to two oppositely located points of a full-wave rectifier comprising four diodes 45 to 48. The two other opposite points of this rectifier are connected to ground through resistors 49 and 50. The phase splitter and the rectifier are incorporated in the circuit arrangement because the differentiated interference pulses present therein may commence both with a positive or a negative portion and because it is important that the interference is detected as soon as possible. In case of both a positive or a negative interference pulse a positive pulse occurs across the resistor 50 which pulse causes a normally cut-off transistor 51 to conduct if its amplitude is large enough to exceed the junction voltage (0.6 volt) of this transistor.

Furthermore the circuit arrangement includes a monostable multivibrator including a pnp-transistor 52 and an npn-transistor 53. A capacitor 54 and a resistor 55 connected in parallel therewith is arranged both in the collector line of transistor 51 and in the emitter line of transistor 52. The collector electrode of transistor 52 is connected to ground through a collector resistor 56 and to the base electrode of transistor 53. The collector electrode of transistor 53 is fed back to the supply voltage through a collector resistor 57, and to the base electrode of transistor 52 through a variable potential divider 58–59. The collector voltage of transistor 53 controls a transistor 60 whose emitter line includes a resistor 61 and whose collector line includes a resistor 62. Negative switching pulses, which occur at the collector electrode of transistor 60, are applied through a resistor 63 to the gate electrode of the field effect transistor 21. Positive switching pulses from the emitter electrode of transistor 60 are applied through a capacitor **63*a* of low value to the drain electrode of the field effect transistor 21. This capacitor 63*a* serves to compensate the negative switching pulses which occur at the drain electrode through the inter-electrode capacitance between gate and drain electrode of transistor 21**. Sometimes it may even be advantageous to compensate the capacitance between gate and input electrodes in a similar manner.

In their normal condition transistors 52 and 53 are conducting and transistor 51 is cut off. The emitter current of transistor 52 produces a certain voltage across resistor 55, which voltage is also present across capacitor 54. Therefore this capacitor is charged to a given value.

As soon as an interference pulse is received, transistor 51 is rendered conducting for a short period. This results in capacitor 54 being further charged rapidly in the negative direction while the attendent voltage drop on the emitter electrode of transistor 52 reduces the current through this transistor. Series-arranged with capacitor 54 is a resistor 64 which on the one hand prevents the charge current through transistor 51 from becoming too large and on the other hand ensures a rapid voltage drop on the emitter electrode of transistor 52. The reduced current through transistor 52 in turn causes the current through transistor 53 to be reduced. The resultant voltage increase at the collector electrode of transistor 53 further cuts off transistor 52 through potential divider 58–59.

Consequently, in the resultant situation the transistors 52 and 53 are cut off, whereas meanwhile transistor 51 has become non-conducting again, for this transistor is only rendered conducting by the very narrow pulses which are derived from the edges of the interference pulses. During this situation capacitor 54 is discharged across resistor 55. After a certain period, the time constant of the monostable multivibrator, the voltage at the emitter electrode of transistor 52 has increased as a result of this discharge to such an extent that this transistor and, due to the cumulative action, also transistor 53 are rendered conducting again. It is to be noted that the described monostable multivibrator is of a special kind. In fact, when during the discharge of capacitor 54 the next pulse renders transistor 51 conducting again, capacitor 54 is recharged so that the period of the multivibrator being in its operating condition is automatically extended. The monostable multivibrator thus returns to its rest condition only after a period which is equal to the time constant has elapsed after the last occurring pulse at the base electrode of transistor 51. When using a conventional monostable multivibrator in which a second pulse following a first pulse within the period of the time constant has no influence on the action of the multivibrator, the gate transistor may be rendered conducting just at the instant when the second interference has a large value.

The positive going output pulses from transistor 53 are amplified in transistor 60 and converted into negative going pulses which temporarily cut off field effect transistor 21 serving as a gate transistor through resistor 63. Thus as soon as an interference pulse appears in the audio signal which occurs across resistor 20, the field effect transistor 21 is cut off so that the interference pulse is prevented from appearing at the output. The time constant of the monostable multivibrator and hence the duration of the switching pulses which cut off field effect transistor 21 is chosen to be such (for example, 30 $\mu$usec.) that the entire interference pulse occurring in the audio signal is stopped. The delay network (2 to 3 $\mu$usec.) incorporated between transistors 5 and 17 ensures that the field effect transistor is cut off before the interference pulse appears across resistor 20.

As soon as field effect transistor 21 is cut off, the voltage at the gate electrode of field effect transistor 23 is determined by the charge of storage capacitor 22. This charge originates from and corresponds to the level of the non-interfered audio signal which was present across the storage capacitor just before the occurrence of the interference pulse. Consequently, it is achieved with the aid of the described circuit arrangement that during the occurrence of an interference pulse the signal level is maintained constant at the value which the signal had just before the occurrence of the interference pulse.

It is found to be advantageous to maintain the signal level constant at a value which is equal to the mean signal level over a certain period (for example, 10 $\mu$usec.) before interference. This may be achieved in a simple manner by including a resistor in series with the storage capacitor or between the drain electrode of transistor 21 and the storage capacitor (compare resistor 69 in the detailed circuit diagram of FIG. 2). This resistor has the following effects.

1. The resistor 69 together with the storage capacitor 22 cause a delay of the signal relative to the switching pulses at the gate electrode of transistor 21. This delay is not accompanied by an extension of the interference pulses which would be the case when using an RC-network before the gate transistor.

2. The integrating action of resistor 69 and storage capacitor 22 avoids the occurrence of RF noise or interference across the storage capacitor and hence prevents the level of the storage capacitor voltage from being retained at an accidental noise or interference peak at the commencement of an interference.

3. The resistor 69 reduces the switching pulses which occur across the storage capacitor through the parasitic capacitances of the gate transistor. This simplifies the problem of compensation of these pulses.

It has been found that a considerably increased noise level occurs in the circuit arrangement described so far when a stereo signal is received. This is principally caused by the 19 kHz pilot tone present in this signal and serving for the demodulation of the stereo difference signal in a stereo receiver. Its reason is that during interference the voltage across storage capacitor 22 is equal to the audio signal which is present just before interference, increased or decreased by the instantaneous value of the pilot tone likewise being present just before interference. During interference the audio signal is therefore not retained at the correct value but at a value which deviates therefrom, which deviation is dependent on the phase of the pilot signal at the commencement of an interference pulse. When a stereo signal which is handled by the circuit arrangement described is also utilized for stereo reproduction it is additionally important that the 19 kHz pilot signal is obtained free from phase errors, because the phase of the pilot signal is of essential importance for the detection of the stereo difference signal. The interference pulses in the received signal cause phase errors in the pilot signal so that it is not possible to derive the pilot signal before the gating circuit 21. On the other hand the fact that the voltage across storage capacitor 22 in the circuit arrangement described so far is retained constant for some time during interference also produces a phase error in the pilot signal when this is recovered from the signal across the storage capacitor. Consequently, a considerably increased noise level occurs in case of stereoreproduction.

The above-mentioned drawbacks are substantially avoided in that a parallel resonant circuit 65 tuned to the 19 kHz pilot signal is arranged in series with the storage capacitor 22. This circuit oscillates in a 19 kHz rhythm with the correct phase and amplitude as is determined by the pilot tone applied through the conducting transistor 21, and consequently only the remaining portion of the audio signal is present across capacitor 22. As soon as transistor 21 is cut off due to an interference pulse, the voltage across storage capacitor 22 is retained on the one hand and the circuit 65 continues to oscillate at substantially the same amplitude and phase on the other hand. The signal at the gate electrode of transistor 23 and hence the output signal therefore contains an audio component which is uninfluenced by the pilot tone and a pilot tone which is free from phase interferences.

It is to be noted that in the case of a stereo receiver the output voltage of resistor 25 may be applied to a stereo decoder where the 19 kHz pilot tone present in this signal may subsequently be filtered out. However, it is alternatively possible to apply the voltage across the circuit 65 directly to the stereo decoder 70 (compare the detailed circuit diagram of FIG. 2) so that a 19 kHz filter may be economized in the stereo decoder.

When a stereo signal is received the output signal of detector 3 includes a difference signal component modulated on a suppressed carrier of 38 kHz. In the case of a mono receiver this difference signal component may be suppressed by incorporating, for example, as is shown in FIG. 1, a circuit 66 tuned to 38 kHz in the emitter line of transistor 5. This circuit then provides a feedback for this component. In the case of a stereo receiver (see the detailed circuit diagram of FIG. 2) a circuit 68 tuned to 38 kHz is preferably included in series with storage capacitor 22 and in series with the 19 kHz circuit 65 so that also the 38 kHz component of the signal is passed on uninterfered by switching of transistor 21.

It is to be noted that in the case of a mono receiver it is not quite possible to suppress the 19 kHz pilot tone before the gate transistor 21, for example, with the aid of a 19 kHz circuit in the emitter line of transistor 5. In fact such a circuit would widen the interference pulses too much so that the switching pulses from the monostable multivibrator would have to be widened correspondingly. Then, however, an unnecessarily large portion of the desired signal is suppressed.

It has been found that eminent interference-free sound reproduction may be obtained with the aid of the circuit arrangement described so far, even in those cases where so many interference pulses occur that the gate transistor 21 is cut off over approximately 50 percent of the time. If the number of interference pulses is still further increased, for example, because the received signal intensity reduces (fading) it may occur that the gate transistor 21 is substantially continuously cut off and a signal is only occasionally passed so that a highly distorted signal is produced. This drawback may be obviated by ensuring that only a portion of the interference pulses, preferably the strongest interference pulses, can switch the monostable multivibrator 52–53 and this in such a manner that the gate transistor 21 is never cut off for more than a given portion of the time, for example, half of the time.

In order to achieve this, the circuit arrangement of FIG. 1 includes an integrating network connected to the emitter resistor 61 of transistor 60, which network consists of a resistor 71 and a capacitor 72. The direct voltage across this capacitor is a measure of the number of switching pulses provided by the monostable multivibrator as well as of the mean duration of these pulses. The direct voltage across the capacitor 72 is therefore a measure of the portion of the cut-off time of gate transistor 21. This direct voltage is applied to two series-arranged diodes 73 and 74 whose junction is connected to the junction of capacitors 32 and 33. If few interference pulses occur, the voltage across capacitor 72 is low. The diodes 73 and 74 then have a comparatively high internal resistance and all interference pulses are passed unhampered through capacitors 32 and 33. However, as more interference pulses occur, the voltage across capacitor 72 increases and hence the internal resistance of the diodes 73 and 74 decreases. The interference pulses are therefore attenuated so that only the stronger interference pulses cause the monostable multivibrator to be changed over.

Instead of changing the amplitudes of the interference pulses, an alternative possibility is to have the direct voltage across capacitor 72 shift the threshold voltage which must be exceeded by the interference pulses so as to start the monostable multivibrator which may be realized, for example, by including a resistor 75 in the emitter line of transistor 51 and by applying the direct voltage of the capacitor 72 to the emitter electrode of this transistor.

If desired, both the control of the amplitudes of the interference pulses and the control of the threshold voltage may be given a delayed character, so that the control becomes active only at a given value of the direct voltage across capacitor 72. In case of comparatively small numbers of interference pulses, the interference suppression is then active for all pulses. Such a delayed control may be carried into effect, for example, by including a zener diode 75*a* or some series-arranged diodes or any other known delay element in the line originating from capacitor 72.

FIG. 3 shows a further embodiment. In this embodiment the fact is utilized that an interference pulse becomes manifest in the received signal both in the shape of an interference in phase and in the shape of an interference in amplitude. The phase interference is detected by the FM detector and produces the unwanted interference in the signal to be reproduced. The amplitude interference is used to detect the occurrence of the interference pulse. To this end the IF signal is applied to an amplitude detector comprising a diode 76, a resistor 77 and a capacitor 78. The IF-signal should of course be derived from a suitable position in the IF amplifier 2 where the amplitude of this signal is not notably limited yet.

The detected interference pulses are applied to the base electrode of a pnp-transistor 82 through a coupling capacitor 79, a parallel-arranged inductor 80 which serves to suppress AF components originating from AF-AM modulation of the IF signal, and subsequently through a 10.7 MHz parallel circuit 81 for the suppression of IF carrier remainders. The collector electrode of transistor 82 is connected to ground and the emitter electrode is connected to the base electrode of transistor 51 and to the supply voltage through a resistor 83. The emitter electrode of transistor 51 is connected to a potentiometer 84 which serves for adjusting the threshold value of this transistor. The further circuit of the monostable multivibrator including transistors 52 and 53 and capacitor 54 is equal to that of FIG. 1 and is therefore not further referred to. When a positive interference pulse appears at the base electrode of transistor 82, the current throuh this transistor is reduced so that the base voltage of transistor 51 increases. When this increase is large enough to exceed the threshold voltage adjusted with the aid of potentiometer 84, transistor 51 starts to conduct. In a corresponding manner as described with reference to FIG. 1, the capacitor 54 is charged and the monostable multivibrator is changed over.

The signal from the FM detector 3 is applied through a coupling capacitor 85 to the base electrode of a transistor 86 arranged as an emitter follower and including base potential divider 87–88 and emitter resistor 89. The output signal from this emitter follower is subsequently applied to the collector electrode of a bipolar transistor 90 operating as a gate transistor. The base electrode of this transistor is connected to the supply voltage through the series arrangement of two resistors 91 and 92. The emitter electrode of a transistor 93 is connected to the collector electrode of transistor 90 and the collector electrode is connected to the junction of resistors 91 and 92. The base electrode of transistor 93 is connected both to the supply voltage through a resistor 94 and to the collector electrode of transistor 53 through a resistor 95.

The output signal from gate transistor 90 is applied to the series arrangement of a resistor 69, a storage capacitor 22 and a 19 kHz circuit 65 in a corresponding manner as described with reference to FIGS. 1 and 2. The signal across storage capacitor 22 and circuit 65 is subsequently applied through a coupling capacitor 96 to the base electrode of an emitter follower transistor 97 including base resistor 98 and emitter resistor 99. The output signal is derived from the emitter electrode of transistor 97 by means of a capacitor 100.

In the absence of interference pulses the collector voltage of transistor 53 is low, so that transistor 93 is cut off. In that case a base current flows to transistor 90 through resistors 92 and 91 so that a low resistive connection exists between collector and emitter electrodes of this transistor through which connection the signal is passed on to storage capacitor 22 and circuit 65. When an interference pulse occurs, which causes the monostable multivibrator 52 – 53 to be changed over, the voltage at the base electrode of transistor 93 increases so that this transistor is saturated. Then base current no longer flows in transistor 90 and a very high impedance exists between its collector and emitter electrodes so that the interference pulse is prevented from reaching storage capacitor 22 and circuit 65. The signal level at the output is then only determined by the voltage of the storage capacitor and the oscillation of the 19 kHz circuit 65.

As has been described the signal is applied to the collector electrode of transistor 90 and is derived from its emitter electrode. It has been found that a much smaller portion of the switching pulses present through transistor 93 on the base electrode of transistor 90 reaches the storage capacitor 22 than when collector and emitter electrodes would have been exchanged.

In the circuit arrangement of FIG. 3 it is not always necessary to use a delay network (compare FIG. 1) because the IF amplifier 2 and the detector 3 already bring about a sufficient delay of their own accord.

A capacitor 101 of low value is arranged across resistor 89. This capacitor serves to somewhat smooth the switching pulses which reach the collector electrode of transistor 90. Furthermore, this capacitor produces some delay of the signal and higher signal frequencies, for example, the 38 kHz difference component of a stereo signal in the mono receiver are attenuated by this capacitor.

What is claimed is:

1. A circuit for suppressing interference signals in a composite signal having an information signal, a pilot signal of a given frequency, and interference signals, said circuit comprising means for detecting said composite signal; a gate having a signal input coupled to said detecting means, a control input, and an output; means for detecting said interference signals having an input adapted to receive at least said interference signals and an output means for providing detected interference signals; a pulse shaper means coupled to said interference detector output for supplying pulses to said control input of said gate upon the occurrence of said interference signals to block said gate; a storage capacitor coupled to said gate output; and means for supplying a signal having the frequency of said pilot signal to said capacitor with the proper phase during the blocked periods of said gate comprising a first parallel resonant circuit tuned to said given pilot frequency which continues to oscillate during said blocked periods at said pilot frequency and series coupled to said capacitor.

2. A circuit as claimed in claim 1 wherein said information signal comprises a double sideband suppressed carrier signal and said circuit further comprises means for supplying said information signal during the blocked periods of said gate comprising a second parallel resonant circuit tuned to the frequency of said carrier and coupled in series with said capacitor and said first resonant circuit.

3. A circuit as claimed in claim 1 further comprising a resistor coupled between said gate output and said capacitor.

4. A circuit as claimed in claim 9 wherein said resistor and said capacitor have a time constant of substantially 10 microseconds.

5. A circuit as claimed in claim 1 wherein said gate comprises a bipolar transistor having emitter, base, and collector electrodes, said electrodes being said output, said control input, and said signal input respectively.

* * * * *